United States Patent [19]

Cook

[11] 3,809,970

[45] May 7, 1974

[54] SOLID STATE TIMING CIRCUIT

[75] Inventor: Robert G. Cook, Cedarburg, Wis.

[73] Assignee: Square D Company, Park Ridge, Ill.

[22] Filed: Mar. 26, 1973

[21] Appl. No.: 345,163

[52] U.S. Cl. .............................. 317/141 S, 307/293
[51] Int. Cl. ...................... H03k 17/28, H01h 47/18
[58] Field of Search ...... 317/141 S, 142 R; 307/293

[56] References Cited

UNITED STATES PATENTS

| | | | |
|---|---|---|---|
| 2,950,422 | 8/1960 | Purkhiser | 317/142 R |
| 3,457,433 | 7/1969 | Watson | 317/141 S |
| 3,473,054 | 10/1969 | Wieczorek | 307/293 |
| 3,622,811 | 11/1971 | Houpt | 317/141 S |

*Primary Examiner*—L. T. Hix
*Attorney, Agent, or Firm*—William H. Schmeling; Harold J. Rathbun

[57] ABSTRACT

A solid state circuit for controlling the energization of four magnet coils as may be used in a solid state timing relay. The circuit is arranged so two of the four coils are immediately energized when a first direct current source is connected to the circuit and the remaining two magnet coils are energized or remain energized for a predetermined time interval after the first direct current source is energized or de-energized, respectively. The circuit also is connected to a second direct current source that is continuously energized and during the timing period applies a reverse potential in series with a previously charged timing capacitor to provide consistent accurately timed periods.

12 Claims, 2 Drawing Figures

FIG. I

SOLID STATE TIMING CIRCUIT

Figure 1:
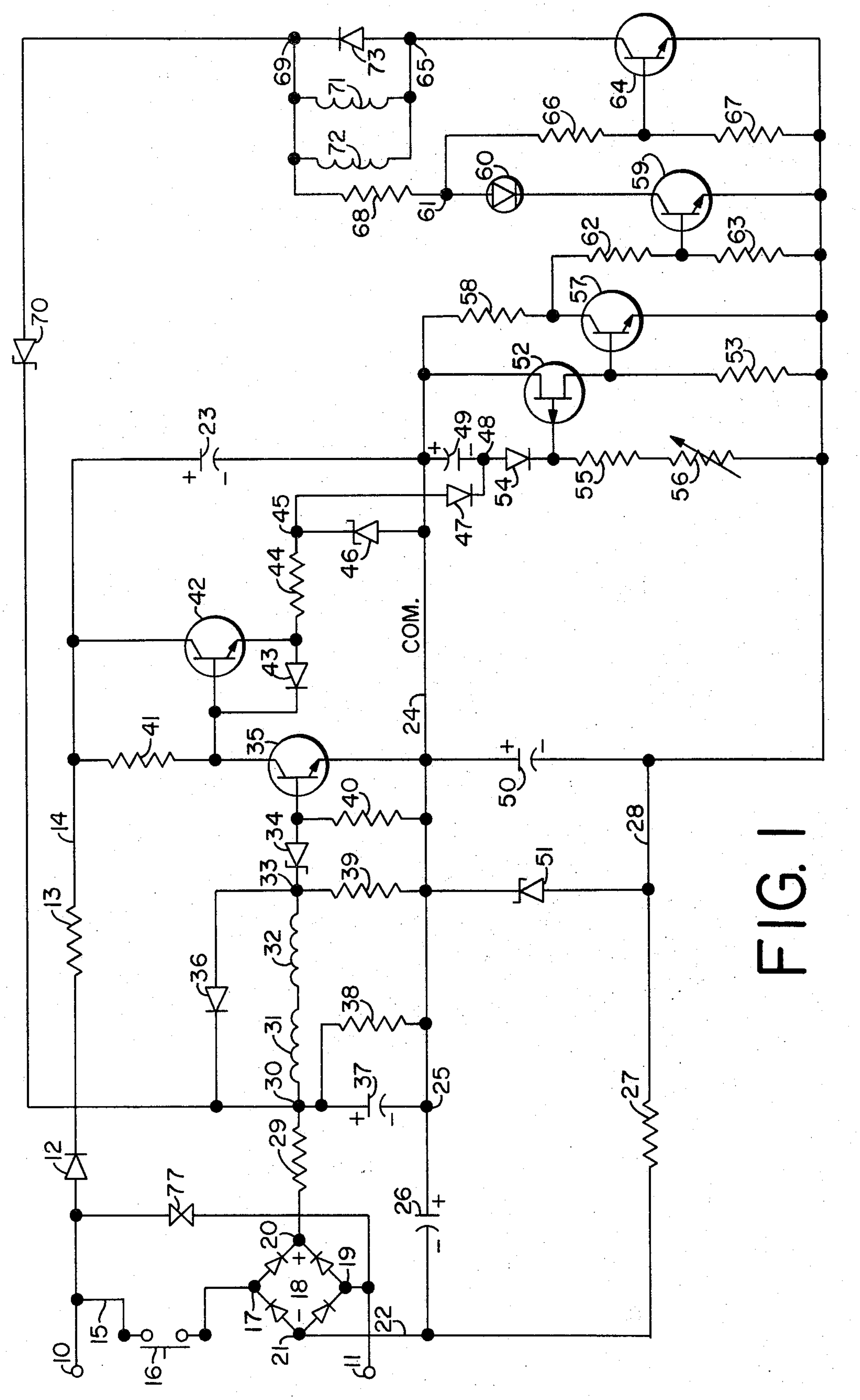

This invention relates to electrical timing circuits and more particularly to a timing circuit wherein a timing capacitor is charged to a predetermined potential in one direction prior to the initiation of a timing period and during the timing period is discharged through a timing circuit that tends to reverse the charge on the capacitor and a field effect transistor that has its conduction controlled by the level of the charge on the capacitor.

Timing circuits, including a timing capacitor and a field effect transistor, are well known as illustrated by U.S. Pat. No. 3,473,054, which was granted to the inventor Robert A. Wieczorek on Oct. 14, 1969. While the circuit disclosed in the Wieczorek patent has been used successfully to time periods up to five minutes, its repeat accuracy was impaired by the first cycle effect which occurred when the wet-slug tantalum capacitor was charged the first time after an idle period. In the timing circuit according to the present invention, the first cycle effect is eliminated by charging the wet-slug type tantalum capacitor to a predetermined level prior to the initiation of the timing period and using the RC discharge of the capacitor to control the duration of the timing period. Further, the linearity of the discharge rate of the timing capacitor is improved by including a reverse potential source in the discharge circuit for the capacitor which causes the capacitor to discharge toward a negative voltage rather than zero.

It is an object of the present invention to provide an improved timing circuit in which a magnet coil serves as an output means.

A further object is to provide an improved timing circuit in which a timing capacitor is charged to a predetermined level prior to the initiation of a timing period and a field effect transistor is used to sense the charge level on the capacitor and is switched to a saturated state when the charge level is decreased to a predetermined level.

Another object is to provide an improved timing circuit for a solid state timing relay which will provide the relay with an instantaneous output and a timed output when a control circuit for the relay is energized.

An additional object is to provide an improved timing circuit in which a timing capacitor is charged to a predetermined level prior to the initiation of a timing period and a field effect transistor is used to sense the charge level on the capacitor and is switched to a saturated state when the charge level is decreased to a predetermined level and to provide a reverse voltage bias in the discharge circuit for the capacitor to increase the linearity of the timing circuit.

A further object is to provide a timing circuit for a solid state relay which will cause the relay to switch a first circuit concurrently when a control circuit for the relay is energized and switch a second circuit a predetermined time interval after the control circuit is energized and to provide a means for visually indicating that the timing circuit is operating to delay the switching of the second circuit.

Another object is to provide a timing circuit for a solid state relay which will cause a first and a second circuit to be switched concurrently with the energization of a control circuit for the relay and to cause the first circuit to be switched concurrently and the second circuit to be switched a predetermined time after the control circuit is de-energized and to provide a means for visually indicating that the control circuit is de-energized and the timing circuit is operating to delay the switching of the second circuit after the control circuit is de-energized.

Figure 2:
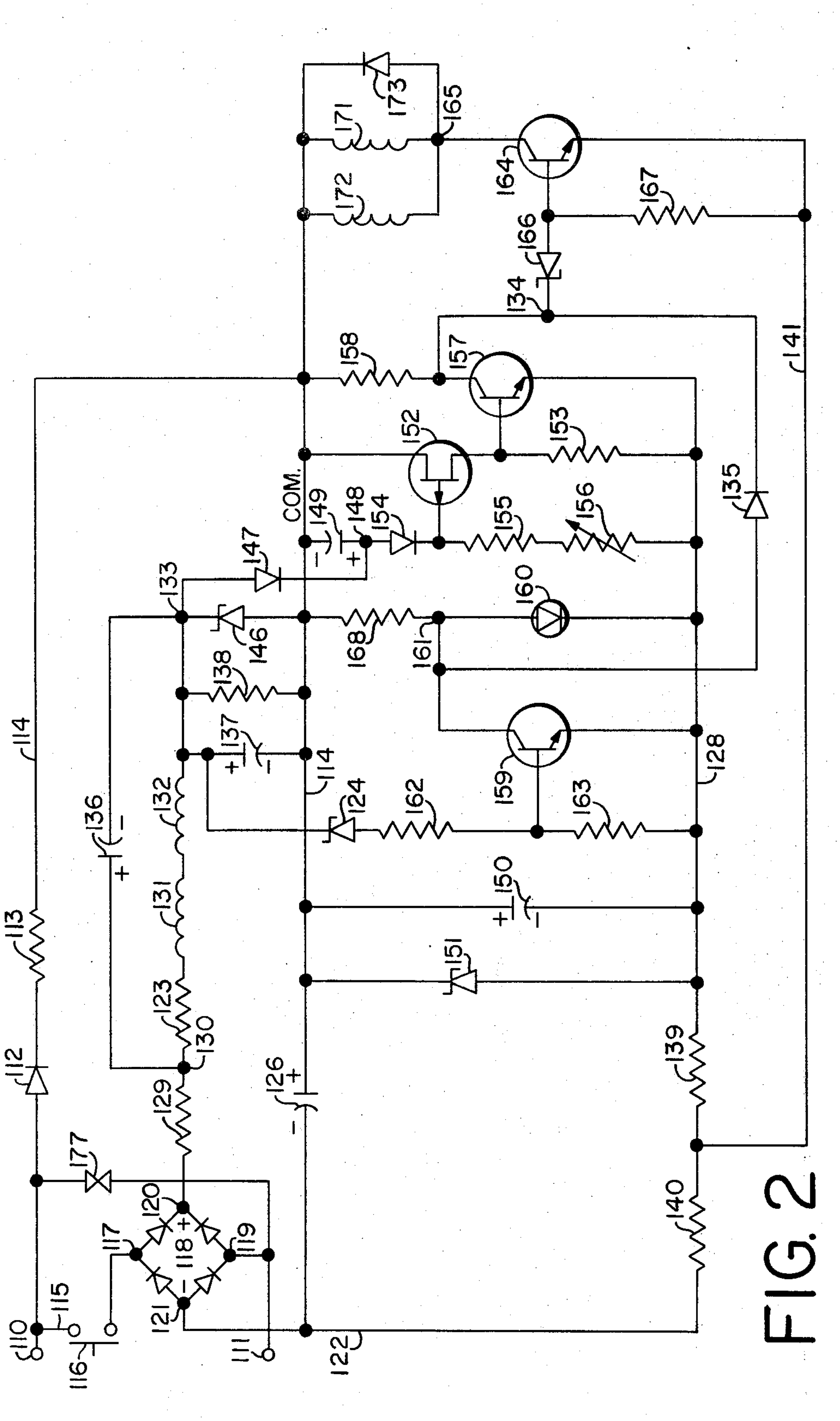

Further objects and features of the invention will be readily apparent to those skilled in the art from the following specification and from the appended drawings illustrating certain preferred embodiments, in which:

FIG. 1 schematically shows one form of a timing circuit incorporating the features of the present invention;

FIG. 2 schematically shows a second form of a timing circuit incorporating the features of the present invention.

In FIG. 1 of the drawing, a circuit particularly suited for use in a solid state timing relay as disclosed in application for U.S. Pat. Ser. No. 345,162 filed Mar. 26, 1973, which is filed by the inventors Clarence N. Groth, James N. Hempel, Robert A. Wieczorek, Charles F. Meyer and Robert G. Cook concurrently herewith. The circuit is mounted on a printed circuit board, as disclosed in the Groth et al. application, and is continuously energized from an alternating current source, not shown, that is connected to a pair of input terminals 10 and 11.

The input terminal 10 is connected through a rectifying diode 12 and a dropping resistor 13 to a lead 14 and through a lead 15 to one side of a switch 16 that has normally open switching contacts. The other side of the switch 16 is connected to an input terminal 17 of a full wave bridge rectifier 18. The terminal 11 is connected to the other input terminal 19 of the rectifier 18. The rectifier 18 has a pair of output terminals 20 and 21 and diodes polarized so the terminal 20 is positive in polarity relative to the terminal 21 when an alternating current is supplied to the terminals 17 and 19. The diode 12 is polarized so the lead 14 is positive in polarity relative to a lead 22. A capacitor 23 has one side connected to the lead 14 and its other side connected through a lead 24 to a junction 25. A capacitor 26 is connected between the junction 25 and the lead 22. The lead 24 serves as a common lead for the circuit. The capacitors 23 and 26 act as a capacitive voltage divider and when charged by current through the diode 12 cause the lead 14 to be positive in polarity relative to the lead 24 and the lead 22 to be negative in polarity relative to the lead 24. A dropping resistor 27 is connected between the lead 22 and a lead 28 which is also negative in polarity relative to the lead 24. The output terminal 20 is connected through a dropping resistor 29 to a junction 30. A pair of magnet coil windings 31 and 32 are connected in series between the junction 30 and a junction 33 which in turn is connected through a Zener diode 34 to the base of a NPN type transistor 35. A diode 36 is connected between the junctions 30 and 33 to conduct the current induced in the coil windings 31 and 32 when the coils 31 and 32 are de-energized. A capacitor 37 is connected between the junction 30 and the lead 24 to filter the output of the rectifier 18. The resistor 38 provides a discharge path for the capacitor 37. A resistor 39, connected between the junction 33 and the lead 24, limits the current flow through the diode 34. A bias resistor 40 is connected between the base of the transistor 35 and the lead 24. The transistor 35 has an emitter directly connected to the lead 24 and a collector connected through a collector load resistor 41 to the lead 14. An NPN type transistor 42 has a collector directly connected to the lead 14 and a base directly connected to the collector of the transistor 35. A diode 43, connected between the base and emitter of the transistor 42, prevents a reverse bias between the emitter and the base of the transistor 42. A dropping resistor 44 is connected between the emitter of the transistor 42 and a junction 45, which in turn is connected by a Zener diode 46 to the lead 24 and through a blocking diode 47 to a junction 48. A timing capacitor 49 is connected between the junction 48 and the lead 24. A filter capacitor 50 and a Zener diode 51 are connected in parallel between the leads 24 and 28 to provide a filtered regulated voltage between the leads 24 and 28. A P-channel type field effect transistor 52 has a source electrode connected directly to the lead 24 and a drain electrode connected through a bias resistor 53 to the lead 28. The junction 48 is connected in an RC discharge circuit for the capacitor 49 that includes a diode 54, a resistor 55 and an adjustable resistor 56. The capacitor 49 is also connected through the diode 54 to the gate of the transistor 52 so the conduction of the transistor is controlled by the charge level on the capacitor 49.

An NPN Type transistor 57 has its emitter directly connected to the lead 28 and its collector connected through a collector load resistor 58 to the lead 24. The base of the transistor 57 is connected to the drain electrode of the transistor 52 and the bias resistor 53 is connected between the base of the transistor 57 and the lead 28.

An NPN type transistor 59 has its emitter directly connected to the lead 28 and its collector connected through a light emitting diode 60 to a junction 61. The base of the transistor 59 is connected through a base load resistor 62 to the collector of the transistor 57 and a resistor 63, connected between the base of transistor 59 and the lead 28, acts as a bias resistor.

An NPN type transistor 64 has its emitter directly connected to the lead 28 and a collector directly connected to a junction 65. The base of the transistor 64 is connected through a base resistor 66 to the junction 61 and through a bias resistor 67 to the lead 28. A dropping resistor 68 is connected between the junction 61 and a junction 69, which in turn is connected through a Zener diode 70 to the junction 30. The Zener diode 70 is connected to act as voltage dropping device between the junctions 30 and 69 to limit current flow through the transistor 64. A pair of magnet coil windings 71 and 72 are connected in parallel between the junctions 65 and 69 and a diode 73 is connected in parallel with the coil windings 71 and 72 to conduct current induced in the coil windings 71 and 72 when the coil windings 71 and 72 are de-energized.

A conventional suppressor 77 connected between the terminals 10 and 11 protects the current from transient voltages of the alternating current source which is connected to the terminals 10 and 11.

The circuit as shown in FIG. 1 will operate and cause the coil windings 31 and 32 to be energized simultaneously with the closure of the switch 16 and the coil windings 71 and 72 to be energized an adjustable time after the switch 16 is closed as follows. During standby conditions, that is, during periods when the switch 16 is open, the rectifier 18 will be de-energized. The de-energized rectifier 18 causes the transistors 35, 59 and 64 to be non-conducting, and the coil windings 31, 32, 71 and 72 to be de-energized. The terminals 10 and 11 are connected to an alternating current source and the diode 12 causes the capacitors 23 and 26 to be charged in a direction which causes the lead 14 to be positive in polarity relative to the common lead 24 and the lead 28 to be negative in polarity relative to the common lead 24. In the embodiment shown, the alternating current source and the Zener diode 51 cause the lead 14 to be at the +25 V.D.C. and the lead 28 to be at −15 V.D.C. relative to the common lead 24.

The non-conducting transistor 35 causes the transistor 42 to conduct and the capacitor 49 to be charged to the potential determined by the Zener diode 46. The charging circuit for the capacitor 49 includes the terminal 10, the diode 12, the resistor 13, the lead 14, the collector to emitter of the conducting transistor 42, the resistor 44, the junction 45, the diode 47, the junction 48, the capacitor 49, and the common lead 24. The capacitor 49, when charged, will cause the junction 48 to be positive relative to the common lead 24 and the transistors 52 and 57 to be non-conducting.

The closure of the switch 16 will cause the rectifier 18 to be energized and the following to occur. The energized rectifier 18 will cause a base to emitter current in the transistor 35 and the coil windings 31 and 32 to be energized when the positive potential exceeds the break-down voltage of the Zener diode 34 through a circuit that includes the terminal 20, the resistor 29, the junction 30, the coil windings 31 and 32, the Zener diode 34, the base to emitter of the transistor 35, the common lead 24, the Zener diode 51, the lead 28, the resistor 27 and the lead 22. The base to emitter current in the transistor 35 causes the transistor 35 to be conductive and the transistor 42 to be non-conductive and the charging circuit for the timing capacitor 49 to be interrupted and the capacitor 49 to discharge through a timing circuit. The timing circuit for controlling the discharge rate of the capacitor 49 includes the junction 48, the diode 54, the resistor 55, the resistor 56, the lead 28, the capacitor 50 and the lead 24. The charge on the capacitors 26 and 50 during the timing period is in a direction which tends to cause the charge on the capacitor 49 to be reversed from a positive 15 volts to a negative 15 volts and causes the discharge rate of the capacitor 49 to be relatively linear as the charge on the capacitor 49 approaches zero volts. The rate of discharge of the capacitor 49 during the timing period is controlled by the resistance of the adjustable resistor 56 and the resistor 55. The resistor 55 is included in the timing circuit to provide a minimum timing period.

The field effect transistor 52 becomes conductive when the charge on the capacitor 49 decreases to a predetermined value and causes the transistor 57 to be conductive and the transistor 59 to switch from a conductive to a non-conductive state. During the timing period, that is, during the interval after the switch 16 is closed and the field effect transistor 52 is maintained non-conductive by the charge on the capacitor 49, the transistor 59 is conductive because it is supplied with base to emitter current because of the non-conducting transistor 57 and collector to emitter current from the energized rectifier 18 through a circuit that includes the resistor 29, the junction 30, the Zener diode 70. the junction 69, the resistor 68, the lighting emitting diode 60 and the collector to emitter of the transistor 59. The light emitting diode 60 will be illuminated by the current flow through the conducting transistor 59 and visually indicate the presence of the timing period.

The transistor 59 becomes non-conductive at the end of the timing period and causes the light emitting diode 60 to be de-energized to indicate that the timing period has ended and the transistor 64 to become conductive. The conducting transistor 64 causes the coil windings 71 and 72 to become energized by current from the energized rectifier 18 through a circuit that includes the resistor 29, the junction 30, the Zener diode 70, the junction 69, the coil windings 71 and 72, the junction 65 and the collector to emitter of the conducting transistor 64.

As disclosed in the Groth et al. application, supra, the coil windings 31, 32, 71 and 72 are arranged to respectively control the operation of the contacts of a reed relay which may have either normally open or normally closed contacts. When the switch 16 is actuated to cause the rectifier 18 to be energized, the coil windings 31 and 32 will be energized by current flow through the base of the transistor 35 and the contacts of the respective reed relays associated with the coil windings 31 and 32 will be operated substantially instantaneously with th closure of the switch 16. An adjustable time interval after the switch 16 is operated to energize the rectifier 18, the coil windings 71 and 72 will be energized by current flow through the conducting transistor 64 and the contacts of the respective reed relays associated with the coil windings 71 and 72 will be operated to provide an ON delay timing function.

The transistor 52 continues to conduct after the timing period has ended and the switch 16 is closed. The diode 54 prevents the capacitor 49 from being charged in the reverse direction which would cause the junction 48 to be negative relative to the lead 24. The wet slug type tantalum capacitor 49 which is used in the circuit is incapable of tolerating reverse voltages. Therefore the diode 54 is provided in the circuit to absorb the slight negative voltage of −0.7 voltage drop which appears between the source to gate electrodes of the transistor 52 during periods when the transistor 52 is conducting so that the voltage appearing across the capacitor 49 after the timing period has ended is substantially zero volts.

The opening of the switch 16 will cause the rectifier 18 as well as the coil windings 31, 32, 71 and 72 to be de-energized and the circuit to return to its standby state. Capacitor 23 is continuously charged to approximately 25 volts by rectified current through the diode 12. The capacitance of the capacitor 23 is selected to be considerably greater than the capacitance of the capacitor 49. Thus when the switch 16 is opened, and the transistor 35 becomes non-conducting and the transistor 42 becomes conducting, the charge on the capacitor 23 is available to charge the capacitor 49 through the conducting transistor 42 and the resistor 44 to quickly reset the timing circuit.

The circuit shown in FIG. 2 may be substituted for the circuit shown in the solid state timing relay disclosed in the Groth et al. application supra to provide an OFF delay timing function instead of an ON delay timing function as provided by the circuit shown in FIG. 1. The circuit shown in FIG. 2 is continuously energized by an alternating current source, not shown, that is connected to a pair of input terminals 110 and 111. The input terminal 110 is connected through a rectifying diode 112 and a dropping resistor 113 to a lead 114, and through a lead 115 to one side of a switch 116 that has normally open switching contacts. The other side of the switch 116 is connected to an input terminal 117 of a full wave bridge rectifier 118. The terminal 111 is connected to the other input terminal 119 of the rectifier 118. The rectifier 118 has a pair of output terminals 120 and 121 and diodes polarized so the terminal 120 is positive in polarity relative to the terminal 121 when an alternating current is supplied to the terminals 117 and 119. The diode 112 is polarized so the lead 114 is positive relative to a lead 122 which is connected to the negative output terminal 121 of the rectifier 118. The lead 114 acts as a common lead for the circuit. A capacitor 126 is connected between the leads 114 and 122 and is charged by current flow through the diode 112 in a direction making the lead 114 positive in polarity relative to the lead 122. The output terminal 120 is connected through a dropping resistor 129 to a junction 130. A pair of series connected magnet coil windings 131 and 132 are connected in series with a resistor 123 between the junction 130 and a junction 133.

A capacitor 137 is connected in parallel between the junction 133 and the lead 114 to filter the output of the rectifier 118. The resistor 138 provides a discharge path for the capacitor 137. The junction 133 is connected by a Zener diode 146 to the lead 114 and through a blocking diode 147 to a junction 148. A timing capacitor 149 is connected between the junction 148 and the lead 114. A filter capacitor 150 and a Zener diode 151 are connected in parallel between the lead 114 and a lead 128 to provide a filtered regulated voltage between the leads 114 and 128. The lead 128 is connected through a pair of series connected dropping resistors 139 and 140 to the lead 122. A charge coupling capacitor 136 is connected between the junctions 130 and 133 to provide a low impedance path for charging current for capacitor 149.

A P channel type field effect transistor 152 has a source electrode directly connected to the lead 114 and a drain electrode connected through a bias resistor 153 to the lead 128. The junction 148 is connected in an RC discharge circuit for the capacitor 149 that includes a diode 154, a resistor 155 and an adjustable resistor 156 and through the diode 154 to the gate of the transistor 152 so the conduction of the transistor 152 is controlled by the charge level on the capacitor 149.

An NPN type transistor 157 has its emitter directly connected to the lead 128 and its collector connected through a collector load resistor 158 to the lead 114. The base of the transistor 157 is connected to the drain electrode of the transistor 152 and the bias resistor 153 is connected between the base of the transistor 157 and the lead 128.

An NPN type transistor 159 has an emitter connected directly to the lead 128 and a collector connected to a junction 161. A light emitting diode 160 is connected between the junction 161 and the lead 128 and a collector load resistor 168 is connected between the junction 161 and the lead 114. The base of the transistor 159 is connected through a base resistor 162 and a Zener diode 124 to the junction 133 and a resistor 163, connected between the base of the transistor 159 and the lead 128, acts as a bias resistor. An NPN type transistor 164 has its emitter directly connected to the lead 141, and its collector connected to a junction 165.

The base of the transistor 164 is connected through a Zener diode 166 to a junction 134. The junction 134 is connected directly to the collector of the transistor 157 and through a logic diode 135 to the collector of transistor 159. The emitter of the transistor 164 is connected by a lead 141 to a junction between the resistors 139 and 140. A resistor 167, connected between the base of the transistor 164 and the lead 141, acts as a bias resistor. A pair of magnet coil windings 171 and 172 are connected in parallel between the junction 165 and the lead 114 and a diode 173 is connected in parallel with the coil windings 171 and 172 to conduct current induced in the coil windings 171 and 172 when the coil windings 171 and 172 are de-energized. A conventional suppressor 177 connected between the terminals 110 and 111 protects the circuit from transient voltages of the alternating current source which is connected to the terminals 110 and 111.

The circuit as shown in FIG. 2 will operate and cause the coil windings 131 and 132 to be energized and de-energized simultaneously with the closing and opening of the contacts of the switch 116 and the coil windings 171 and 172 to be energized simultaneously with the closing and de-energized an adjustable time after the switch 116 is opened as follows. During standby conditions, that is during periods when the switch 116 and the circuit is timed out, the rectifier 118 is de-energized and the capacitor 149 is discharged. The de-energized rectifier 118 causes the coil windings 131 and 132 to be de-energized. The terminals 110 and 111 are connected to an energized alternating current source and the diode 112 causes the capacitors 126 and 150 to be charged in a direction which causes the lead 114 to be positive relative to the lead 128 and the lead 122 to be negative relative to the lead 128. In the embodiment shown, the alternating current source and the Zener diode 151, as well as the resistors 139 and 140, cause the lead 141 to be about −27 V.D.C. negative and the lead 128 to be −15 V.D.C. negative relative to the lead 114.

The discharged capacitor 149 permits the transistors 152 and 157 to be conductive. The conducting transistor 157 causes the transistor 164 to be non-conductive and the coil windings 171 and 172 to be de-energized. Also, the conducting transistor 157 and the de-energized rectifier 118 causes the transistor 159 to be non-conductive and the light emitting diode to be de-energized.

The closure of the switch 116 will cause the rectifier 118 to be energized and the following to occur. The energized rectifier 118 will cause the coil windings 131 and 132 to be energized when the positive potential at the terminal 120 exceeds the break-down voltage of the Zener diode 146 through a circuit that includes: the terminal 120, the resistor 129, the coil windings 131 and 132, the Zener diode 146, the Zener diode 151, the resistors 139 and 140, the lead 122 and the terminal 121. Also, when the rectifier 118 is initially energized, the capacitor 149 is charged by current from the terminal 120 to a level determined by the break-down voltage of the Zener diode 146 through a circuit that includes the resistor 129, the charge coupling capacitor 136, the diode 147, the junction 148, the capacitor 149, the Zener diode 151, the resistors 139 and 140, the lead 122 and the terminal 121 in a direction which causes the junction 148 to be 15 volts positive relative to the lead 114. The charge on the capacitor 149 causes the transistors 152 and 157 to be non-conducting and the transistor 164 to become conducting when the potential at the junction 134 exceeds the breakdown voltage of the Zener diode 166. The conducting transistor 164 causes the coil windings 171 and 172 to be energized by current flowing from the lead 114 to the lead 128. The non-conducting transistor 157 and the energized rectifier 118 cause the transistor 159 to be conducting as the energized rectifier 118 provides base current through the transistor 159 through a circuit that includes the junction 133, the Zener diode 124, the resistor 162 and the base to emitter of the transistor 159. The conducting transistor 159 prevents the light emitting diode 160 from being energized in spite of the fact that the diode 135 is prevented from conducting current by the non-conducting transistor 157. As disclosed in the Groth et al. application supra, the coil windings 131, 132, 171 and 172 are arranged to respectively control the operation of reed relays which may have either normally open or normally closed contacts. Thus when the switch 116 is actuated to cause the rectifier 118 to be energized, the coil windings 131, 132, 171 and 172 will be energized and the contacts of the reed relays associated with the coil windings 131, 132, 171 and 172 respectively will be operated substantially instantaneously with the closure of the switch 116.

The coil windings 131, 132, 171 and 172 will remain energized and the capacitor 149 fully charged as long as the switch 116 remains closed. The opening of the switch 116 will cause the coil windings 131 and 132 to be de-energized concurrently with the opening of the switch 116 and the coil windings 171 and 172 to remain energized for a predetermined time interval after the switch 116 is opened.

The opening of the contacts of the switch 116 causes the rectifier 118 to be de-energized and the coil windings 131 and 132 to be de-energized. The current induced in the coil windings 131 and 132 flows through the rectifier 118 when the coil windings 131 and 132 are initially de-energized.

The base current in transistor 159 ceases when the rectifier 118 is de-energized and the transistor 159 becomes non-conductive. During the timing period the transistors 152 and 157 are maintained non-conductive by the charge on the capacitor 149. The non-conducting transistor 157 prevents the diode 135 from conducting and as the transistor 159 is non-conducting, the light emitting diode 160 becomes energized and illuminated to visually indicate the presence of the timing period.

The capacitor 149 charging current is removed when the rectifier 118 is de-energized and the capacitor 149 begins to discharge through a timing circuit. The timing circuit for controlling the discharge rate of the capacitor 149 includes the junction 148, the diode 154, the resistor 155, the resistor 156, the lead 128, the capacitor 150 and the lead 114. The charge on the capacitors 150 and 126 during the timing period is in a direction to cause the charge on the capacitor 149 to tend to be reversed from a positive 15 volts to a negative 15 volts and causes the discharge rate of the capacitor 149 to be relatively linear as the charge on the capacitor 149 approaches zero volts. The rate of discharge of the capacitor 149 during the timing period is controlled by the resistance of the adjustable resistor 156 and the resistor 155. The resistor 155 is included in the circuit to provide a minimum timing period.

The transistors 152 and 157 are biased against conduction whenever the charge on the capacitor is in a direction which causes the junction 148 to be greater than 3 volts positive relative to the lead 114. During the timing period, the non-conducting transistor 157 causes the light emitting diode 160 to be illuminated and the transistor 164 to be conductive. The conducting transistor 164 causes the coil windings 171 and 172 to remain energized after the switch 116 is opened through a circuit that includes the diode 112, the resistor 113, the lead 114, and the conducting transistor 164.

The timing period ends when the charge on the capacitor 149 decreases to a predetermined value, e.g., 3 volts, and the field effect transistor 152 becomes conductive and causes the transistor 157 to become conductive and the transistor 164 to become non-conductive and the circuit to be in its standby state. The conducting transistor 157 causes the light emitting diode 160 to be de-energized to indicate the end of the timing period as the conducting diode 135 and transistor 157 provide a low impedance path in parallel with the diode 160. The conducting transistor 157 also causes transistor 164 to be non-conducting and the coil windings 171 and 172 to be de-energized.

The transistor 152 continues to conduct after the timing period has ended and the switch 116 is opened and prevents the capacitor 149 from being charged in the reverse direction which would cause the junction 148 to be negative relative to the lead 114. The wet slug type tantalum capacitor 149 which is used in the circuit is incapable of tolerating reverse voltages. Therefore the diode 154 is provided in the circuit to absorb the slight negative voltage of −0.7 voltage drop which appears between the source to gate electrodes of the transistor 152 during periods when the transistor 152 is conducting so that the volage appearing across the capacitor 149 after the timing period has ended is substantially zero volts.

While certain perferred embodiments of the invention have been specifically disclosed, it is understood that the invention is not limited thereto, as many variations will be readily apparent to those skilled in the art and the invention is to be given its broadest possible interpretation within the terms of the following claims.

What is claimed is:

1. A timing circuit comprising: a first direct current source, a timing capacitor, circuit means connecting the capacitor to the first source for charging the capacitor to a predetermined level in a first direction prior to the initiation of a timing period, a second direct current source, circuit means including a time delay circuit connecting the capacitor to the second source for charging the capacitor in a direction opposite the first direction and causing the charge on the capacitor to decrease from the predetermined level at a predetermined rate when the timing period is initiated, and circuit means including a field effect transistor having a source and a gate electrode connected across the capacitor for causing the field effect transistor to be non-conductive when the capacitor is charged to the predetermined level in the first direction and for causing the field effect transistor to be conductive when the charge on the capacitor is decreased from the predetermined level at the predetermined rate to a second predetermined level.

2. The timing circuit as recited in claim 1 including a light emitting device and a transistor having an emitter and collector connected to cause the light emitting device to be energized when the timing period is initiated and the field effect transistor is non-conductive.

3. The timing circuit as recited in claim 2 wherein the timing period is initiated when the first direct current source is initially energized to provide an ON delay timing circuit function.

4. The timing circuit as recited in claim 2 wherein the timing period is initiated when the first direct current source is initially de-energized to provide an OFF delay timing circuit function.

5. The timing circuit as recited in claim 3 including a first magnet coil connected to be energized by the first source whenever the first source is energized, a second magnet coil, a second transistor and means connecting the transistor to the field effect transistor and the second magnet coil for causing the second magnet coil to be energized by the first source when the field effect transistor is conductive.

6. The timing circuit as recited in claim 4 including a first magnet coil connected to be energized by the first source whenever the first source is energized, a second magnet coil, a second transistor and means connecting the transistor to the field effect transistor and the second magnet coil for causing the second magnet coil to be energized by the second source when the field effect transistor is non-conductive.

7. The timing circuit as recited in claim 2 wherein the transistor has an emitter and collector connected in a series circuit with the light emitting device across the first source and a base connected to have the conductive state of the transistor controlled by the potential at the drain electrode of the field effect transistor.

8. The timing circuit as recited in claim 2 wherein the transistor has an emitter and collector connected in a parallel circuit with the light emitting device across the second source and a base connected to the first source for causing the transistor to be conductive whenever the first source is energized.

9. The timing circuit as recited in claim 1 wherein the first source is continuously energized and the timing period is initiated when the second source is energized.

10. The timing circuit as recited in claim 1 wherein the first source is continuously energized and the timing period is initiated when the second source is de-energized.

11. The timing circuit as recited in claim 5 wherein the first source is continuously energized and the timing period is initiated when the second source is energized.

12. The timing circuit as recited in claim 6 wherein the first source is continuously energized and the timing period is initiated when the second source is de-energized.

* * * * *

UNITED STATES PATENT OFFICE
CERTIFICATE OF CORRECTION

Patent No. 3,809,970 Dated May 7, 1974

Inventor(s) Robert G. Cook

It is certified that error appears in the above-identified patent and that said Letters Patent are hereby corrected as shown below:

Column 10, lines 48, 52, 56 and 60, "first" should read -- second --.
lines 49, 53, 57 and 61, "second" should read -- first --.

Signed and Sealed this

Fourteenth Day of June 1977

[SEAL]

*Attest:*

RUTH C. MASON
*Attesting Officer*

C. MARSHALL DANN
*Commissioner of Patents and Trademarks*